US000001812H

United States Statutory Invention Registration [19]

[11] Reg. Number: H1,812

Arcuri

[45] Published: Nov. 2, 1999

[54] METHOD FOR ENCODING BOUNDING BOXES OF DRAWING PRIMITIVES TO BE RENDERED FOR MULTI-RESOLUTION SUPERSAMPLED FRAME BUFFERS

[75] Inventor: Salvatore Arcuri, Dublin, Calif.

[73] Assignee: Sun Microsystems, Inc., Palo Alto, Calif.

[21] Appl. No.: 08/956,744

[22] Filed: Oct. 24, 1997

[51] Int. Cl.[6] ..... H04N 7/00

[52] U.S. Cl. ..... 345/428

*Primary Examiner*—Daniel T. Pihulic
*Attorney, Agent, or Firm*—Young Law Firm

[57] ABSTRACT

A method of encoding and storing locations of bounding boxes of drawing primitives to be rendered on a multi-resolution display that includes a plurality of regions of different resolution, at least one of which is subdivided into a plurality of sub-regions. The method includes steps of dividing the viewable area of the multi-resolution display into four quadrants and encoding only selected attributes of each of the plurality of bounding box locations within only one of the four quadrants of the multi-resolution display. The encoded selected attributes are then stored in a number of locations of a memory. The selected attributes include information regarding the regions of different resolutions within the multi-resolution display and the boundary lines therebetween, such as the region of lowest resolution partially covered by each of the bounding boxes; either the number of boundary lines cutting each of the bounding boxes or the number of sub bounding boxes forming each of the bounding boxes; either the direction of the first boundary line cutting through each of the bounding boxes or the direction of the sub-region of lowest resolution partially covered by each of the bounding boxes; and an indication as to whether a portion of the region of lowest resolution appears on both sides of the first cut cutting through each of the bounding boxes.

15 Claims, 10 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR ENCODING BOUNDING BOXES OF DRAWING PRIMITIVES TO BE RENDERED FOR MULTI-RESOLUTION SUPERSAMPLED FRAME BUFFERS

BACKGROUND OF THE INVENTION

1. Field of the Invention

The invention pertains to the field of computer graphics. More particularly, the present invention relates to a method for encoding locations of bounding boxes of drawing primitives such as triangles to be rendered on a multi-resolution display.

2. Description of the Related Art

Graphics processors typically contain at least two sections: a geometry section and a rendering section. The geometry section carries out the floating-point calculations to calculate the size and orientation of three-dimensional polygons, which are drawing primitives used in computer graphics. The most important drawing primitives used in graphics generation are triangles. The three-dimensional triangles computed by the geometry section are then projected and rendered onto the display device in two dimensions.

A technique called supersampling is used to improve the perceived quality of the display by attenuating aliasing, even though the display resolution is fixed. Supersampling can either be regular or stochastic. In regular supersampling, a number of regularly spaced samples are taken for each pixel. These samples are then re-sampled or averaged out to yield the pixel value. Stochastic supersampling, on the other hand, in some aspects more closely resembles the human eye's structure, wherein the photoreceptors of the retina are randomly and uniformly distributed, and no closer to one another than a minimum distance. In the field of computer graphics, stochastic supersampling refers to a random, uniform and independent distribution of samples for each pixel. These samples are then averaged to yield the pixel value. This effectively corresponds to creating a virtual image at high resolution and digitally down-filtering the result, to eliminate the high frequencies that are the source of aliasing. Supersampling has the practical effect of moving the Nyquist limit to higher frequencies.

To return to the human model, because the eye contains an array of non-uniformly distributed photoreceptors, it is extremely good at eliminating aliasing effects. Moreover, the photoreceptors in the foveal region of the eye, the center region, are much more tightly packed than in the peripheral region, or in the medial region between the foveal and peripheral regions. Indeed, the density of photoreceptors decreases from a maximum in the foveal region, to an intermediate distribution in the medial region, and to the lowest distribution of photoreceptors in the peripheral region.

Conventional frame buffers are memories that are organized as rectangular arrays of uniformly sampled pixel values. For every pixel on the final display device, there is a single pixel of memory storage in the frame buffer. There is thus a one to one correspondence between the 2D-memory address of a given pixel and its 2D-sample address for the mathematics of rendering.

Stochastically sampled variable resolution frame buffers, on the other hand, break the frame buffer into smaller regions whose attributes can vary dynamically. FIG. 1 shows a graphical representation of such a multi-resolution frame buffer. Reference numeral 100, generally shows a graphical representation of a multi-resolution frame buffer. The buffer is divided into three regions, each of the regions having a different sampling density. The sampling density is constant within each of the three regions. The three regions are: the foveal region 130, the medial region 120 and the peripheral region 110. The foveal region 130 is the region of highest sampling density, including 16 samples per 1 screen pixel. The foveal region is nested within the medial region, which is the region of the multi-resolution frame buffer having the next highest sampling density. The sampling density of the medial region is a constant 4 samples per 1 screen pixel. The medial region, in turn, is nested within the outermost region, the peripheral region. The sampling density of the peripheral region is 1 sample every 16 screen pixels. Thus, the multi-resolution screen buffer's structure roughly approximates the distribution of photoreceptors in the human eye.

FIG. 2 illustrates, at 200, further divisions within the multi-resolution frame buffer of FIG. 1. The peripheral region 110 and the medial regions 120 of FIG. 1 are each further divided into sub-regions labeled left, right, top and bottom. The peripheral region 110 comprises four sub-regions of the same kind, meaning four sub-regions belonging to the same region. These sub-regions are the peripheral left sub-region 213, the peripheral right sub-region 214, the peripheral top sub-region 211 and the peripheral bottom region 212. Similarly, the medial region 120 also comprises four sub-regions of the same kind: the medial left sub-region 223, the medial right sub-region 224, the medial top sub-region 221 and the medial bottom sub-region 222. The foveal region 230 is the same as the foveal region 130 of FIG. 1, and is not further broken down. Each of the regions is rectangular, allowing an easy translation from a 2D location within a sub-region to a linear address in the frame buffer memory.

FIG. 3 illustrates a multi-resolution frame buffer 300, wherein the sub-regions are further divided into bins. Bins belonging to the same region have an equal number of stochastic sample points associated therewith. The bins 330 of the foveal region 130 have a constant sample density, the bins 324 of the medial region 120 have a constant sample density and the peripheral bins 314 of the peripheral region 110 also have a constant sample density. The sampling density of the foveal region is greater than the sampling density of the medial region, which has a greater sampling density than the peripheral region. This means that the resultant image will have a greater perceived resolution at the center, the perceived resolution decreasing toward the peripheral areas of the display. Alternatively, the region of highest sampling density can be dynamically moved about the display, in synchronism with the user's eye movements, which may be tracked with an eye-tracking device. In this manner, the region of highest sampling density may be always located where the user is looking.

Triangles prior to processing are encapsulated in a bounding box. A bounding box is any box that contains a drawing primitive, such as a triangle. Such a bounding box is shown in FIG. 4 at reference numeral 402. In FIG. 4, the edges of the bounding box 402 are defined by the edges of the smallest rectangle containing the triangle 401. To reduce the accuracy requirements of the geometry and rendering sections, most computations are performed using a slightly larger box than the bounding box, instead of the full screen. Such a slightly larger box is called a bin-bounding box. The sides of a bin-bounding box correspond to the nearest integral bin-boundaries of the region having the lowest resolution. In other words, the bin-bounding box 405 shown in FIG. 4 is created by snapping the bounding box 402 to the coarsest grid, meaning the grid of next lowest resolution. As can be seen, the bin-bounding box 405 covers portions of three sub-regions. Indeed, the bin-bounding box 405 covers portions of the peripheral left sub-region, the peripheral top sub-region and the medial left sub-region.

Reference is now made to FIG. 5, which shows a bin-bounding box 505 apart from the rest of the multi-resolution frame buffer shown in FIG. 4. The bin-bounding box 505 contains three sub bounding boxes; namely, sub-box 510, sub-box 520 and sub-box 530 corresponding to the peripheral left, the peripheral top and the medial left sub-regions, respectively. The sub bounding boxes each have a constant resolution corresponding to the sub-region they occupy. Conventionally, to completely define a bin-bounding box, each of the sides of each sub bounding box had to be specified. Specification of a bin-bounding box consisted in identifying the four sides of each constituent sub bounding box, the four sides being aligned with the grid lines. As shown in FIG. 6, these four sides can be: an edge of the bin-bounding box; or any of the sub-region boundary lines: the peripheral top line PT; the peripheral bottom line PB; the peripheral right line PR; the peripheral left line PL; the medial top line MT; the medial bottom line MB; the medial right line MR; the medial left line ML; the foveal top line FT; the foveal bottom line FB; the foveal right line FR and the foveal left line FL.

Because the viewable area is divided into several regions, and because the triangles are limited in size so as not to cross more than one region boundary line, the bounding box locations may be categorized into 13 locations in the horizontal direction and 13 locations in the vertical direction, as shown in FIG. 6. The thirteen locations in the horizontal direction are:

0) to the left of the left peripheral line (PL);
1) across the left peripheral line(PL);
2) between the left peripheral line (PL) and the left medial (ML) line;
3) across the left medial line (ML);
4) between the left medial line (ML) and the left foveal line (FL);
5) across the left foveal line (FL);
6) between the left foveal line (FL)and the right foveal line (FR);
7) across the right foveal line (FR);
8) between the right foveal line (FR) and the right medial line (MR);
9) across the right medial line (MR);
10) between the right medial line (MR)and the right peripheral line (PR);
11) across the right peripheral line (PR); and
12) to the right of the right peripheral line (PR);

The thirteen locations in the vertical direction are the following:

0) below the bottom peripheral line (PB);
1) across the bottom peripheral line (PB);
2) between the bottom peripheral line (PB) and the bottom medial line (MB);
3) across the bottom medial line (MB);
4) between the bottom medial line (MB) and the bottom foveal line (FB);
5) across the bottom foveal line (FB);
6) between the bottom foveal line (FB) and the top foveal line (FT);
7) across the top foveal line (FT);
8) between the top foveal line (FT) and the top medial line (MT);
9) across the top medial line (MT);
10) between the top medial line (MT) and the top peripheral line (PT);
11) across the top peripheral line (PT); and
12) above the top peripheral line (PT);

With thirteen possible locations in the horizontal direction and thirteen possible locations in the vertical direction, the total number of location combinations is 13×13, or 169 combinations. It follows that the bin-bounding box and the sub bounding boxes locations must be defined in terms of these combinations. The solution that has been proposed thus far consists in utilizing a ROM that stores all of the combinations.

The width of a data word in such a ROM is calculated as follows. Each edge of each sub-box is encoded with 2 bits. As sub bounding boxes have four edges, 2×4=8 bits are needed to encode a sub bounding box. Up to three sub-boxes are potentially needed to specify a bin-bounding box which straddles three sub-regions, so 8×3=24 bits are needed to encode a bin-bounding box. As there are 169 possible location combinations, a 169 by 24 bit wide ROM is needed. This results in a 4056 bit ROM.

One technique that has been utilized to reduce the size of the ROM is to note that triangles that are located in groups 0 and 12, although being capable of being processed by the geometry section, cannot be rendered on the display as they would be outside of the physical boundaries of the display. Therefore, triangles that are located outside the display may safely be ignored during the rendering process. This reduces the number of different combinations of locations to 11×11=121. Thus, the size of the ROM can be reduced from 4056 to 121×24=2,904 bits.

However, a 2094 bit ROM for specifying triangle bin-bounding boxes is large, and occupies an inordinate and unacceptable silicon area on a graphics processor integrated circuit embodying such geometry and rendering sections. Moreover, such a large ROM also entails complex programming and increases the probability that errors will be introduced. Moreover, such a conventional ROM includes memory locations for bits describing each of the three sub-regions that a particular bin-bounding box may occupy. Not all triangles to be rendered, however, occupy three sub-regions. Indeed, encoding bounding boxes that do not cross sub-region boundaries, or that cross only one sub-region boundary, will result in empty spaces in the ROM that are not used. Such a ROM will not be fully populated, which is an inefficient use of the available silicon area on the integrated circuit.

What is needed, therefore, is a method for encoding bounding boxes of drawing primitives to be rendered for multi-resolution supersampled frame buffers which is more efficient than was previously available.

There is also a need for an encoding method which, by virtue of its efficiency in describing bounding box locations, simplifies programming of memories used for storing bounding box locations, and which reduces the probability that errors will be introduced therein during programming.

SUMMARY OF THE INVENTION

It is, therefore, an object of the present invention to provide an efficient method for encoding bounding boxes for drawing primitives to be rendered for multi-resolution frame buffers.

It is also an object of the present invention to provide an encoding method that allows the use of a smaller memory for storing bin-bounding box locations than was previously available.

In particular, it is a further object of the present invention to reduce the number of memory locations of such a memory, to reduce the number of bits stored in each location and to simplify the programming of such a memory.

In accordance with the above objects and those that will be mentioned and will become apparent below, the method of encoding and storing locations of bounding boxes of drawing primitives to be rendered on a multi-resolution display according to the present invention comprises the steps of:

dividing a viewable area of the multi-resolution display into four quadrants;

encoding only selected attributes of each of a plurality of bounding box locations within only one of the four quadrants of the multi-resolution display, the selected attributes including information regarding regions and sub-regions of different resolutions within the multi-resolution display and boundary lines therebetween; and storing the encoded selected attributes in a memory.

The dividing step, in an exemplary embodiment, divides the viewable area along two lines of symmetry to create the four quadrants.

According to another embodiment of the present invention, at least one of the regions is subdivided into a plurality of sub-regions by boundary lines, and the selected attributes include information relative to the region of lowest resolution partially covered by each of the bounding boxes; either the number of boundary lines cutting each of the bounding boxes or the number of sub bounding boxes forming each of the bounding boxes; either the direction of the first boundary line cutting through each of the bounding boxes or the direction of the sub-region of lowest resolution partially covered by each of the bounding boxes; and an indication as to whether a portion of the region of lowest resolution appears on both sides of the first boundary line cutting through each of the bounding boxes.

When the viewable area of the multi-resolution display includes first, second and third nested regions of progressively higher resolution, the first and second regions each being divided into four sub-regions, and when the viewable area is divided into four quadrants, the storing step stores the selected attributes in thirty six memory locations, the thirty six locations corresponding to the number of all possible bounding box locations within one of the four quadrants of the viewable area.

When the multi-resolution display includes a peripheral region, a medial region and a foveal region, the foveal region being an innermost region and having a highest resolution, the peripheral and medial regions each being divided into four sub-regions separated by the boundary lines, the selected attributes, according to one embodiment, include two bits to specify the region of lowest resolution for each of the bounding boxes; two bits to specify either the number of boundary lines cutting each of the bounding boxes or the number of sub bounding boxes contained within each of the bounding boxes, one bit to specify either the direction of the first boundary line cutting through each of the bounding boxes or the direction of the sub-region of lowest resolution, and one bit to specify whether a portion of the region of lowest resolution appears on both sides of the first boundary line cutting through each of the bounding boxes.

In one exemplary embodiment, the storing step stores the selected attributes in thirty-six discrete memory locations as six bit data words. The storing step may be carried out by programming a Random Access Memory (RAM), a Read Only memory (ROM), a Programmable Logic Array (PLA), or may be carried out by synthesizing a logic expression.

In another exemplary embodiment, the method of encoding locations of bounding boxes of drawing primitives for a multi-resolution fame buffer according to the present invention, comprises the steps of:

dividing a viewable area of a multi-resolution display into four quadrants along two lines of symmetry;

encoding bounding box locations only within one of the four quadrants; and setting at least one variable from which bounding box locations encoded within the one of the four quadrants of the viewable area may be extrapolated to an entire viewable area of the display.

In a further exemplary embodiment, the setting step sets a first and a second bit for the encoded bounding box locations, the first and second bit indicating whether each encoded bounding box location should be flipped left to right, and bottom to top, respectively, to extrapolate the location of each of the encoded bounding box locations in each of the four quadrants from the encoded bounding box locations in the one quadrant.

According to a still further preferred embodiment, a method of encoding bounding boxes of primitives to be rendered on a multi-resolution display having a plurality of regions of different resolutions, at least one of the regions comprising a plurality of sub-regions, the regions and sub-regions being delimited by boundary lines, comprises:

a first encoding step to encode a region of lowest resolution that is partially covered by each of the bounding boxes;

a second encoding step to encode one of a number of boundary lines cutting each of the bounding boxes and a number of sub bounding boxes contained within the bounding box;

a third encoding step to encode either a direction of a first cut or a direction of a sub region of lowest resolution that is partially covered by each of the bounding boxes; and a fourth encoding step to encode whether a portion of the region of lowest resolution appears on both sides of the first cut cutting through each of the bounding boxes.

According to another embodiment, the multi resolution display comprises three regions, and the first encoding step sets two bits to encode the region of lowest resolution, called the coarsest region; the second encoding step sets two bits to encode either the number of boundary lines cutting each of the bounding boxes or the number of sub bounding boxes contained within each of the bounding boxes; the third encoding step sets one bit to encode either the direction of the first boundary line or the direction of the sub-region of lowest resolution partially covered by each of the bounding boxes; and the fourth encoding step sets one bit to encode whether a portion of the region of lowest resolution appears on both sides of the first cut cutting through each of the bounding boxes.

In another preferred embodiment, the method of specifying and storing locations of bounding boxes of primitives to be rendered on a display comprises the steps of:

dividing a viewable area of the display along two perpendicular lines of symmetry to create four quadrants;

encoding locations of bounding boxes of primitives to be rendered in only one of the four quadrants;

setting a first and a second bit for the encoded location of each the bounding boxes, the first and second bits indicating whether each encoded bounding box location should be flipped left to right, and bottom to top, respectively, to derive the location of each of the encoded bounding boxes in each of the four quadrants from the encoded location in the one quadrant; and storing the encoded locations in a memory.

Advantageously, encoding bounding box locations in only one quadrant reduces the size of the memory needed to encode all bounding box locations within the display.

BRIEF DESCRIPTION OF THE DRAWINGS

For a further understanding of the objects and advantages of the present invention, reference should be made to the following detailed description, taken in conjunction with the accompanying figures, in which.

DESCRIPTION OF THE PREFERRED EMBODIMENTS

Figure 7:
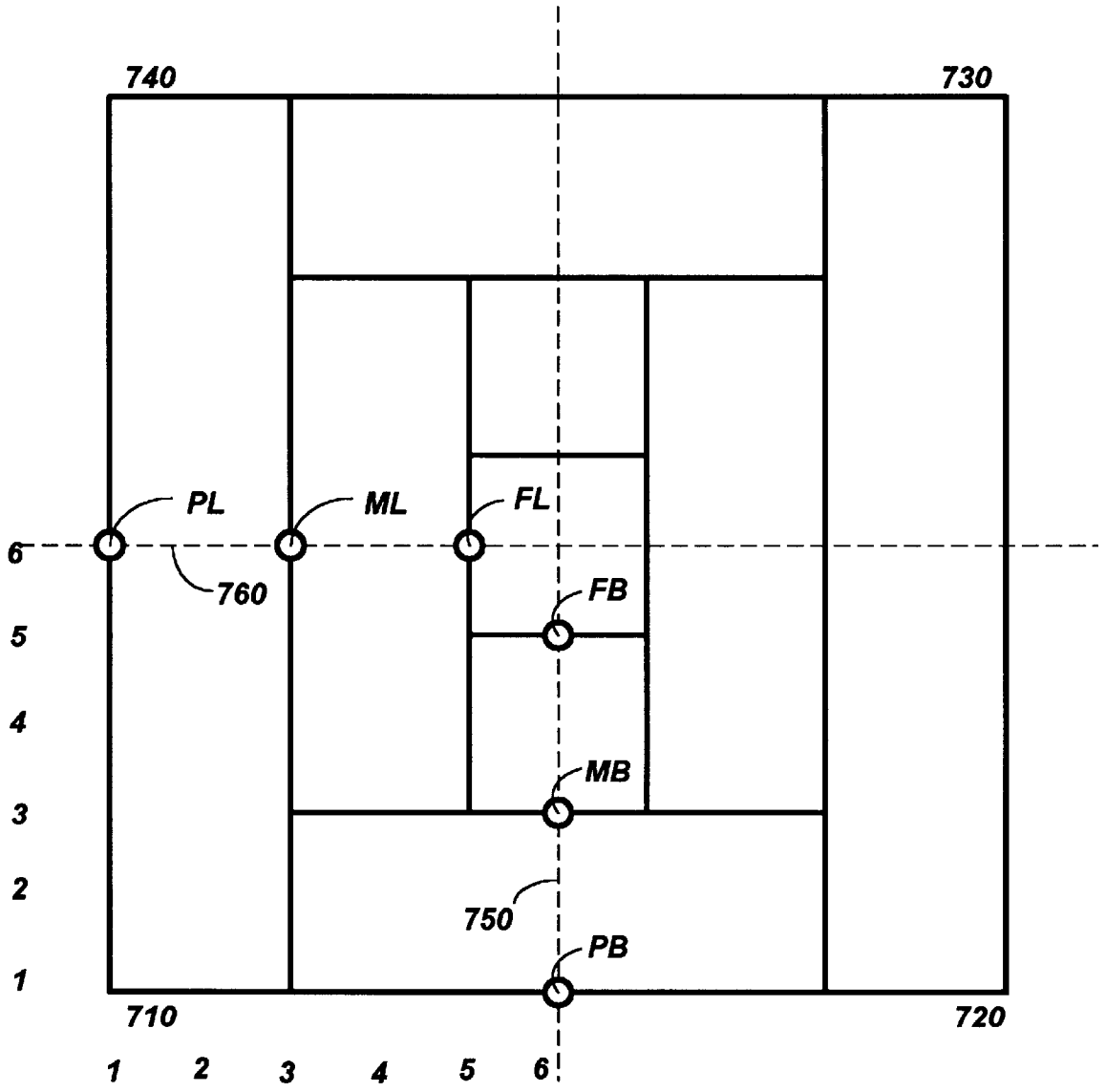
FIG. 7 is a graphical representation of a multi-resolution frame buffer, showing a first aspect of the encoding method according to the present invention.

The present invention is a method of encoding and storing triangle-encapsulating bin-bounding boxes, and will be described with reference to FIGS. 7–10. FIG. 7 is a graphical representation of a multi-resolution frame buffer that is useful in understanding the present invention. To reduce the size of the memory necessary to specify all possible locations of triangles bounding boxes, the symmetry of the frame buffer, according to the present invention, is used to eliminate redundant information. As shown in FIG. 7, the perpendicular dashed lines 750 and 760 separate the four quadrants of the frame buffer. These four quadrants, in a counterclockwise direction, are the first quadrant 710, the second quadrant 720, the third quadrant 730 and the fourth quadrant 740. The line or lines of symmetry, according to the present invention, need not divide the frame buffer into mirror image quadrants. Rather, the lines of symmetry may simply be defined as lines having an equal number of region and sub-regions boundary lines on either side thereof. This means that, for example, the width of the medial left sub-region need not be the same as the width (number of pixels across) of the medial right sub-region. Likewise, the peripheral top sub-region may not be as wide as the peripheral bottom sub-region, while preserving the symmetry of the layout of the regions and sub-regions.

According to the present invention, instead of encoding all possible locations in all four quadrants, only one quadrant is encoded to specify the location of the bounding boxes of triangles or other drawing primitives. The viewable area, therefore, is divided into four quadrants and the encoded result is presented in terms of only one quadrant. As an example, the quadrant that is encoded, in FIG. 7, is the first quadrant 710. However, it should be understood that, thanks to the symmetry of the frame buffer of FIG. 7, any of the quadrants 710, 720, 730 or 740 are equally well suited to being encoded according to the method of the present invention. As only the first quadrant 710 is encoded, the encoded result presented for the first quadrant can be extrapolated to the second, third and fourth quadrants by properly flipping left to right and top to bottom. To specify the flipping from top to bottom, a single bit is used. This single bit called, for example, TopNotBottom may be defined as follows: if the TopNotBottom bit is 0, no bottom to top flipping of the bin-bounding box in quadrant 710 should be carried out. This would indicate that the bin-bounding box is located in either of the bottom quadrants 710 or 720. Conversely, if the TopNotBottom bit is 1, the encoded bin-bounding box in quadrant 710, for example, should be flipped to quadrant 740. Another bit is needed to specify whether the encoded result obtained for quadrant 710 should be flipped left to right. This single bit called, for example, RightNotLeft may be defined as follows: if RightNotLeft is 0, no flipping from left to right is necessary, indicating that the bin-bounding box is located in either of the left hand side quadrants 710 or 740. Conversely, if the RightNotLeft bit is 1, the encoded result obtained for quadrant 710 should be flipped from left to right. Using the TopNotBottom bit together with the RightNotLeft bit allows the result obtained in quadrant 710 to be extrapolated to any of the quadrants 720, 730 or 740. For example, if the (TopNotBottom, RightNotLeft) bit pair is (0,0), then no flipping is to be carried out, and the bin-bounding box is in quadrant 710. For the pair (1,0), the encoded result obtained for quadrant 710 is to be flipped bottom to top, but not flipped left to right, meaning that the bin-bounding box is to be flipped from quadrant 710 to quadrant 740. For the pair (1,1), the bin-bounding box is to be flipped both from bottom to top and from left to right, transferring the encoded location of bin-bounding box from quadrant 710 to quadrant 730.

FIG. 7 shows that, according to the present invention, the possible memory locations have been reduced from an 11×11 matrix to a 6×6 matrix. Therefore, the number of memory locations is reduced from 121 locations for the 11×11 memory to 36 locations for the 6×6 location memory, a reduction of a factor of about 3.

However, the present invention achieves a greater reduction in the bit size of the stochastic memory by also reducing the width of the data words stored in the memory. Indeed, instead of the conventionally required 24 bits to encode the four sides of each bin-sub bounding box, only 6 bits are needed. Therefore, the present invention reduces the number of bits stored in the memory from 2904 to a 36×6 memory having 216 bits, a reduction of a factor of approximately 13.4.

To achieve this reduction, a novel encoding of the bin-bounding sub boxes is used. Whereas the conventional method of encoding sub-bounding boxes encodes each edge of each sub-box, the present invention does not. Instead, the present invention allows the location and the edges of the sub bounding boxes to be derived from knowledge of the edges of the bin bounding box and knowledge of its location. To do this, only selected attributes of the bounding box locations are encoded, the selected attributes including information regarding the regions of different resolutions and the boundary lines therebetween. These selected attributes include four variables.

The first such variable is relates to the coarsest region. The coarsest region, according to the present invention, is the region of lowest resolution or lowest sampling density that is partially covered by the bin-bounding box. For example, if the bin-bounding box partially covers both the medial and the peripheral regions, as does the bin bounding box 910 of FIG. 9, the coarsest region is the peripheral region, as the sampling density of the peripheral region is lower than that of the medial region. Likewise, if the bin-bounding box partially covers both the medial and the foveal region, the coarsest region is the medial region, as the medial region is supersampled to a lesser degree than is the foveal region. However, if the bin-bounding box is located entirely within a single region, that region is the coarsest region. For example, if the bin-bounding box is entirely contained within the medial region, as is bin-bounding box 810 in FIG. 8, the coarsest region is the medial region. When there are only three regions; namely, a peripheral, medial and foveal region, only two bits are needed to specify the coarsest region partially covered by any bin-bounding box. It is to be understood that the present invention is equally applicable to multi resolution frame buffers having a number of regions that is different than three. Of course, the number of bits necessary to encode the coarsest region will vary according to the number of regions within the multi-resolution frame buffer.

The second of the four variables is the number of cuts that the bin-bounding box undergoes. A cut, according to the present invention, is any of the region or sub-region boundary lines, as shown in FIG. 7. As there is an upper limit on the size of triangles, bin-bounding boxes may not partially cover more than two regions. In other words, triangles of such a size as to create bin-bounding boxes that would partially cover three regions (foveal, medial and peripheral) are further divided into smaller triangles prior to rendering. For the three region case, only two bits are necessary to specify the number of cuts undergone by any bin-bounding box, as a bin-bounding box may be divided by zero, one or two cuts. Indeed, a bin-bounding box may not be cut by any region or sub-region boundary line, in which case the bin-bounding box is located entirely within a single sub-region. Such a bin-bounding box would be entirely contained within, for example, the medial left sub-region, as shown in FIG. 8.

Figure 8:
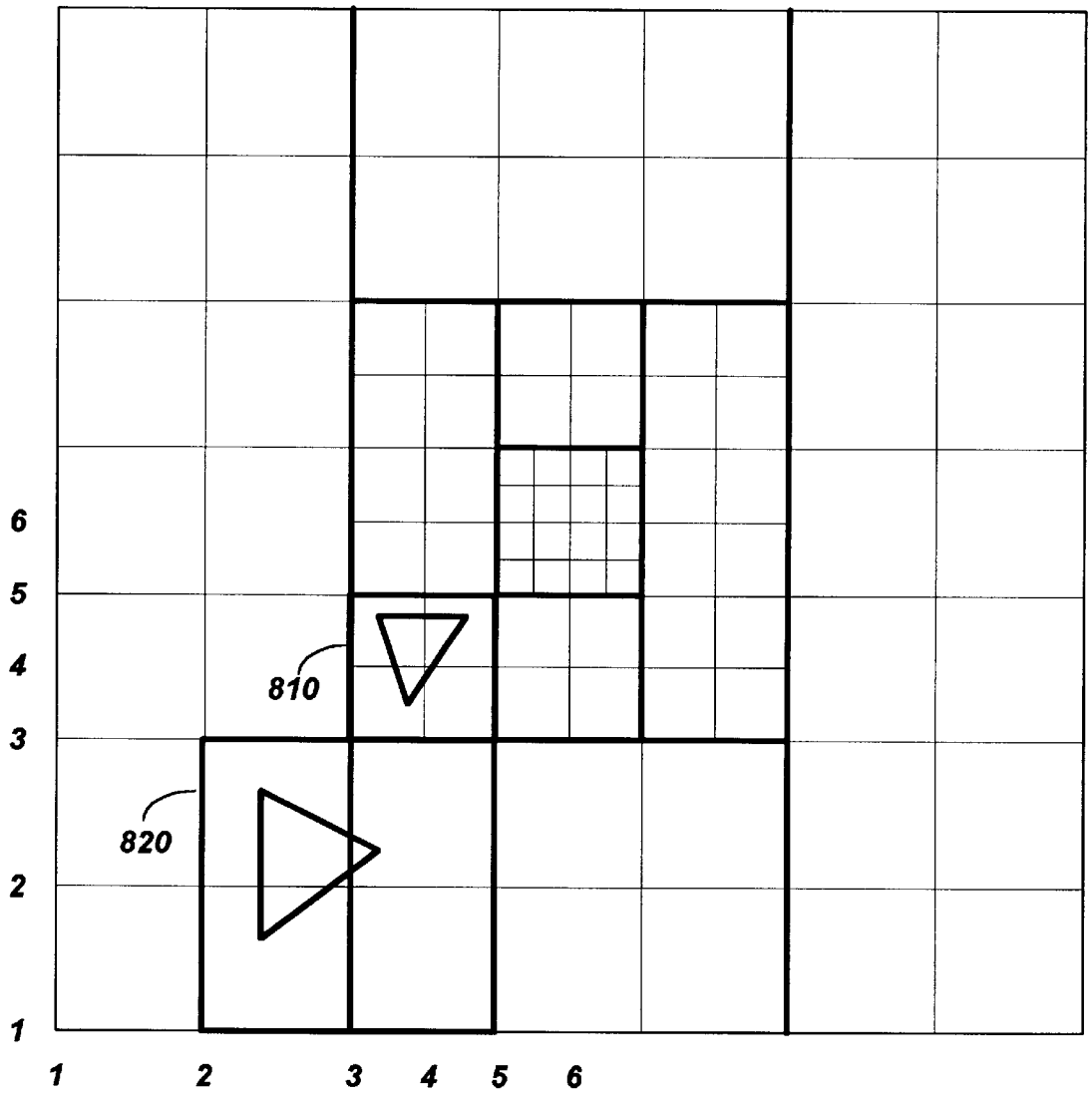
FIG. 8 is a graphical representation of a multi-resolution frame buffer, showing examples of bin bounding boxes to illustrate the encoding method according to the present invention.

FIG. 8 shows a bin bounding box 810 encapsulating a drawing primitive, in this case, a triangle. The bin bounding box 810 is entirely contained within the medial left sub-region, and is thus not cut by any region or sub-region boundary lines. Alternatively, a bin-bounding box may be cut by one region or sub-region boundary line, in which case the bin-bounding box encapsulating the triangle to be rendered partially covers two sub-regions. For example, a bin-bounding box cut only by the medial left boundary line would partially cover the peripheral left sub-region and the medial left sub-region, as shown in FIG. 8. In FIG. 8, the bounding box 820 is cut by the medial left boundary line, dividing the bounding box 820 between the peripheral left sub-region and the peripheral bottom sub-region.

Figure 9:
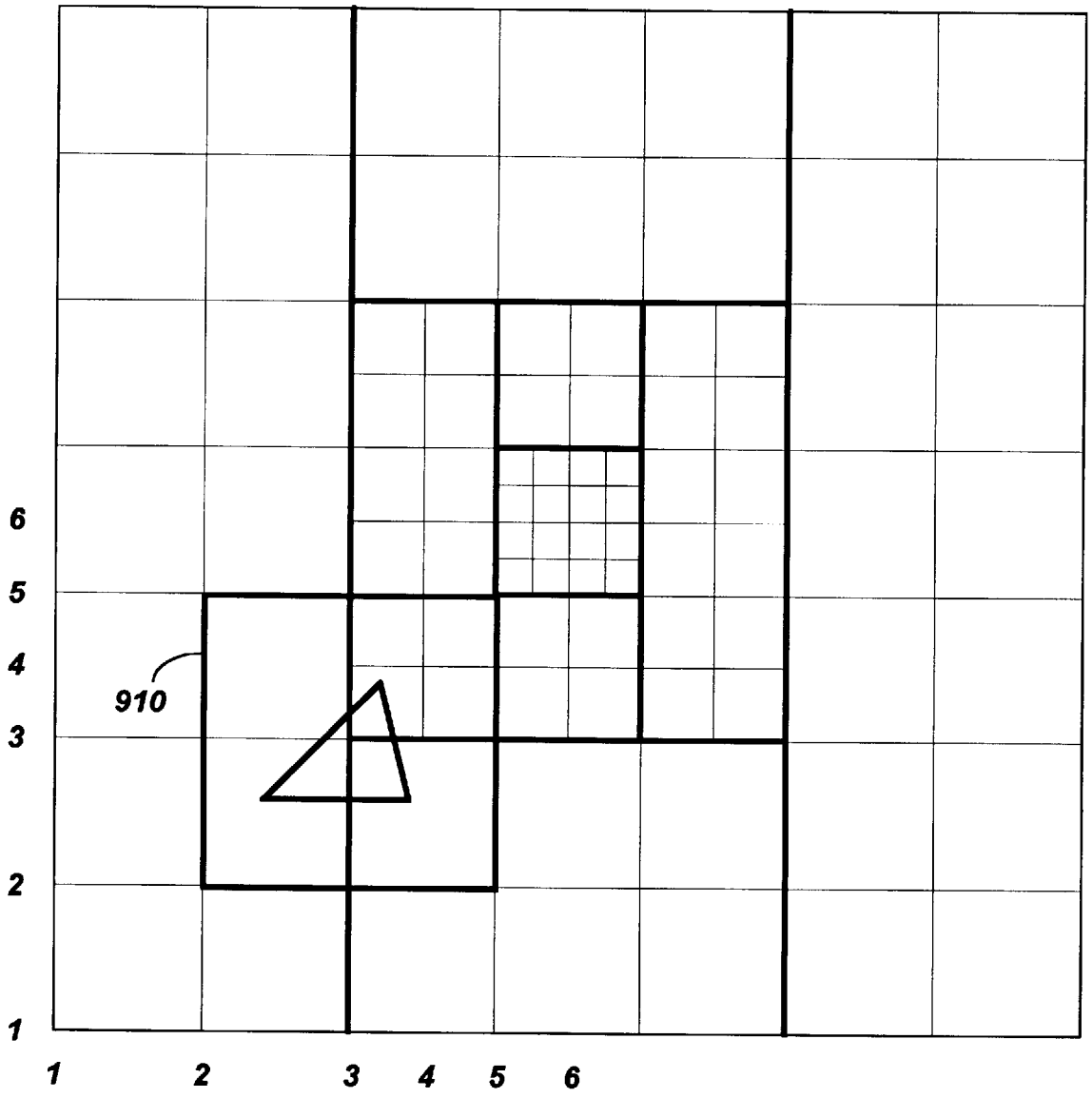
FIG. 9 is a graphical representation of a multi-resolution frame buffer, showing another example of a bin bounding box to illustrate the encoding method according to the present invention.

Alternatively still, a bin-bounding box may be cut by two region or sub-region boundary lines, in which case the bin-bounding box is divided into three sub bounding boxes and partially covers three sub-regions. For example, a bin-bounding box that covers the intersection between the medial left and the medial bottom sub-region boundary lines would be divided into three sub bounding boxes, as is the bounding box 910 in FIG. 9. As shown in FIG. 9, the bin bounding box 910 partially covers the peripheral left sub-region, the peripheral bottom sub-region and the medial left sub-region.

In addition to specifying the coarsest region and the number of cuts, it is also necessary to specify the direction of the first cut or, if there are no cuts, the direction of the coarsest sub-region. The first cut is the cut that divides a bin bounding box in two. The cuts may only be vertical or horizontal, as the region and sub-region boundary lines are vertical and horizontal. The direction of the first cut, therefore, can be encoded using only one bit.

In the case wherein the bin-bounding box is divided by a single sub-region boundary line, as shown in FIG. 8 and bounding box 820, the first cut is the only cut. The first cut of bin-bounding box 820 is vertical, as the medial left boundary line cuts all the way through the bin bounding box 820 to divide it in two.

In the case wherein the bin-bounding box is cut by two sub-region boundary lines, if the first cut is vertical, then the second cut is horizontal. As shown in FIG. 9, the first cut of bin-bounding box 910 is vertical (the medial left boundary line), and the second cut is horizontal (the medial bottom boundary line). Conversely, if the first cut is horizontal, then the second cut is vertical. In any event, a single bit is needed to specify the direction of the first cut. Deriving the direction of the second cut is, therefore, trivial once the direction of the first cut is known.

Figure 1:
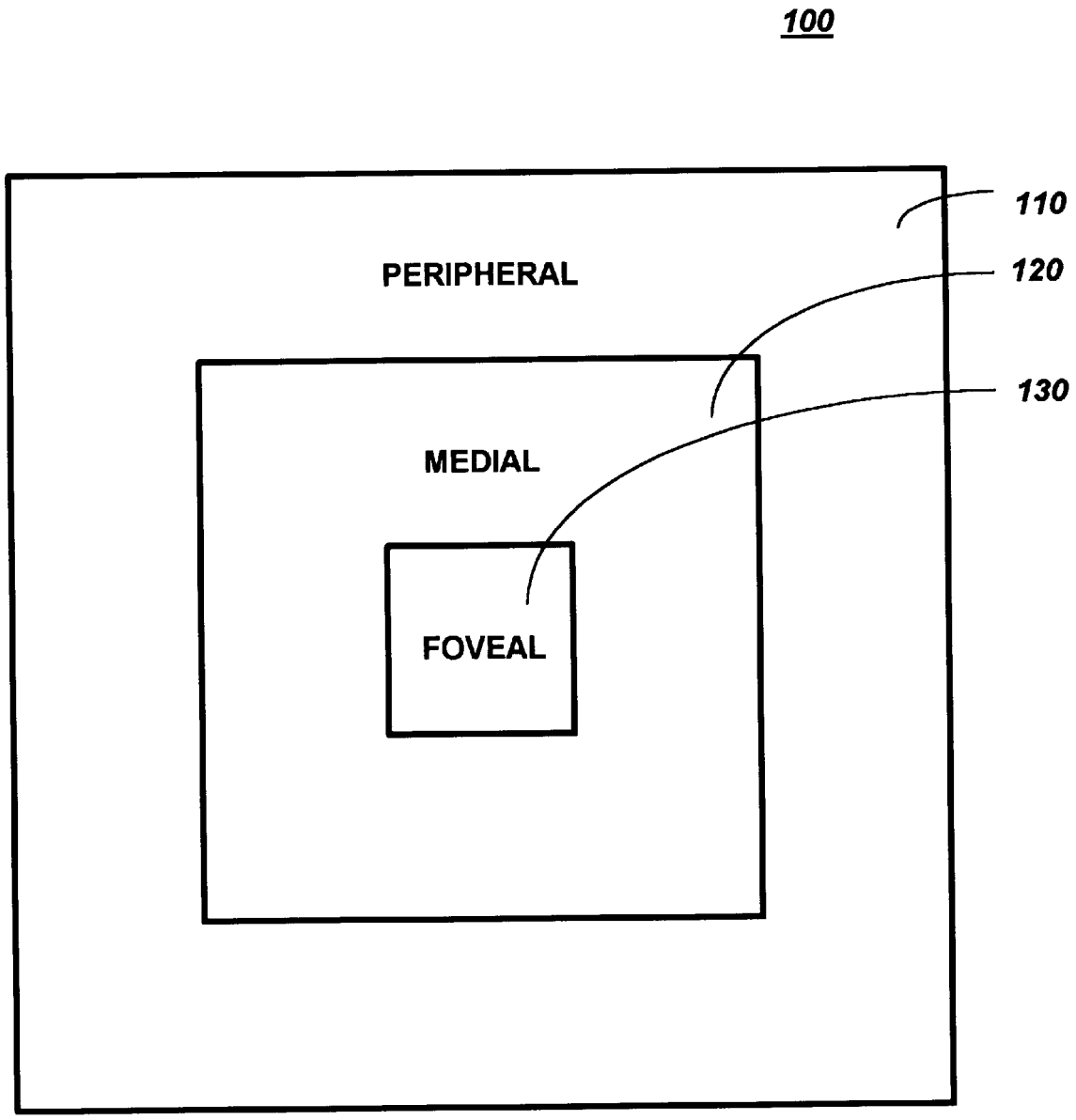
FIG. 1 is a graphical representation of a multi-resolution frame buffer, showing regions of equal sampling density.
Figure 2:
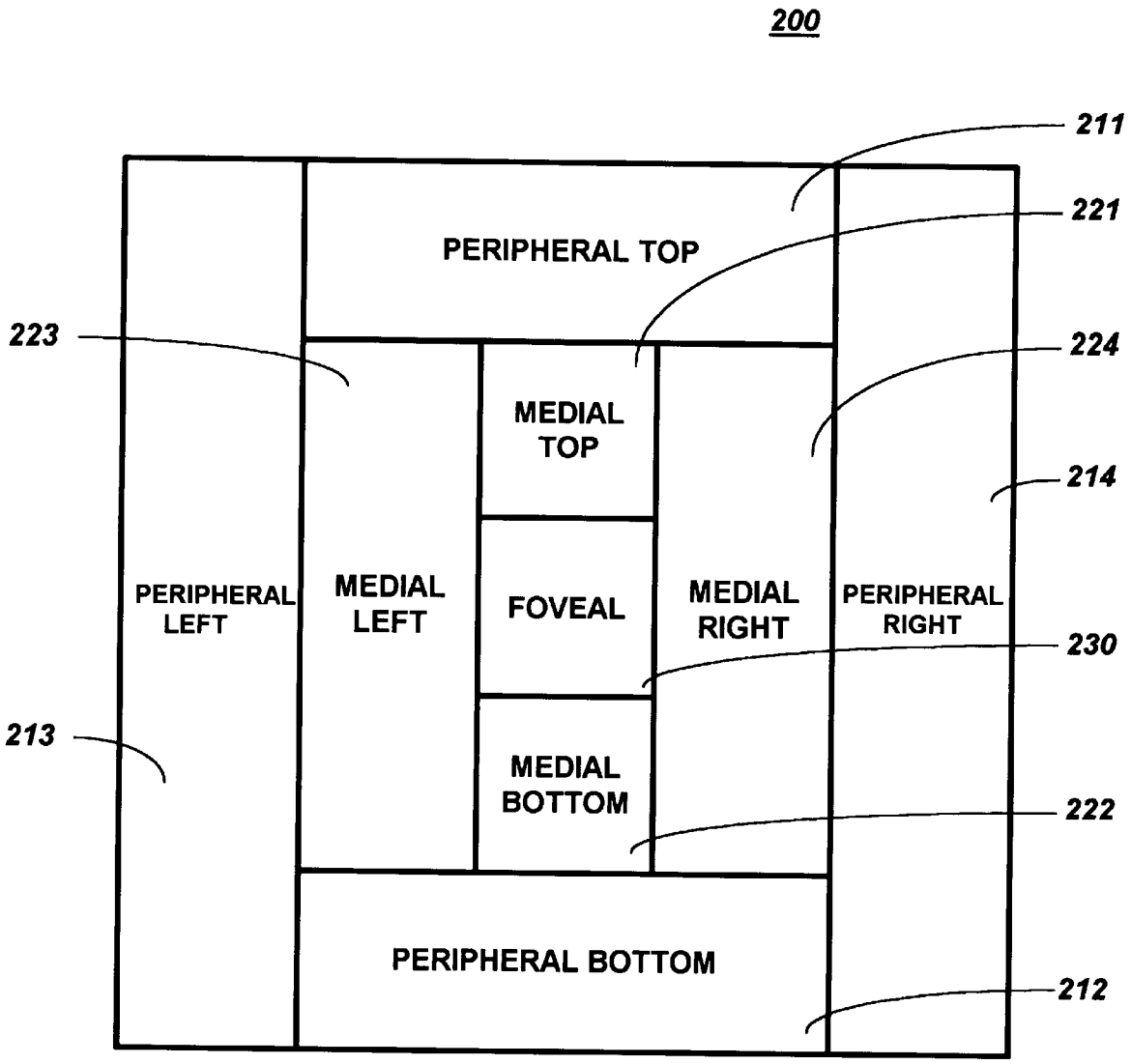
FIG. 2 is a graphical representation of a multi-resolution frame buffer, showing sub-regions of equal sampling density.
Figure 3:
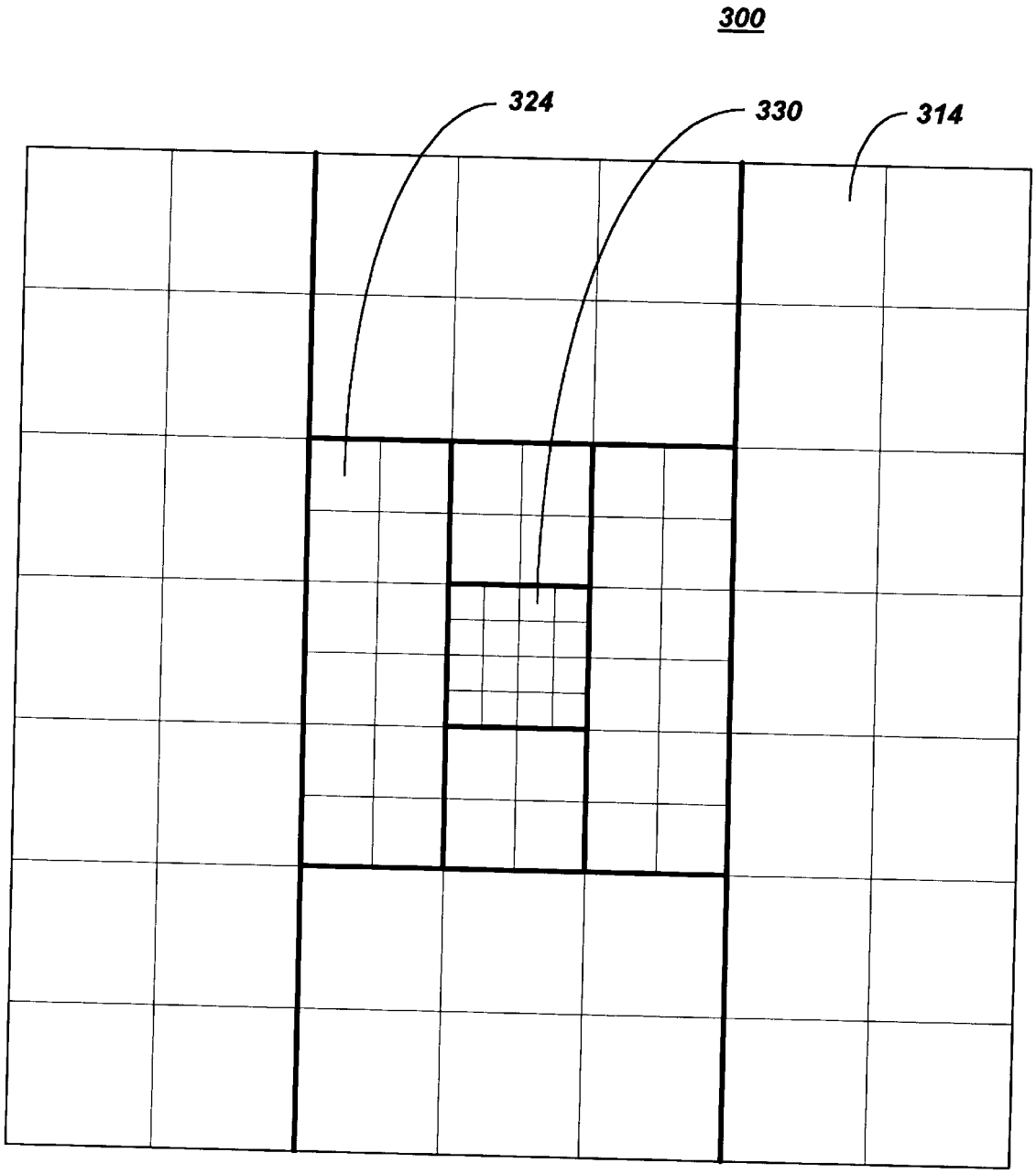
FIG. 3 is a graphical representation of a multi-resolution frame buffer, showing pixel bins of different size distributed within the regions shown in FIG. 1.
Figure 4:
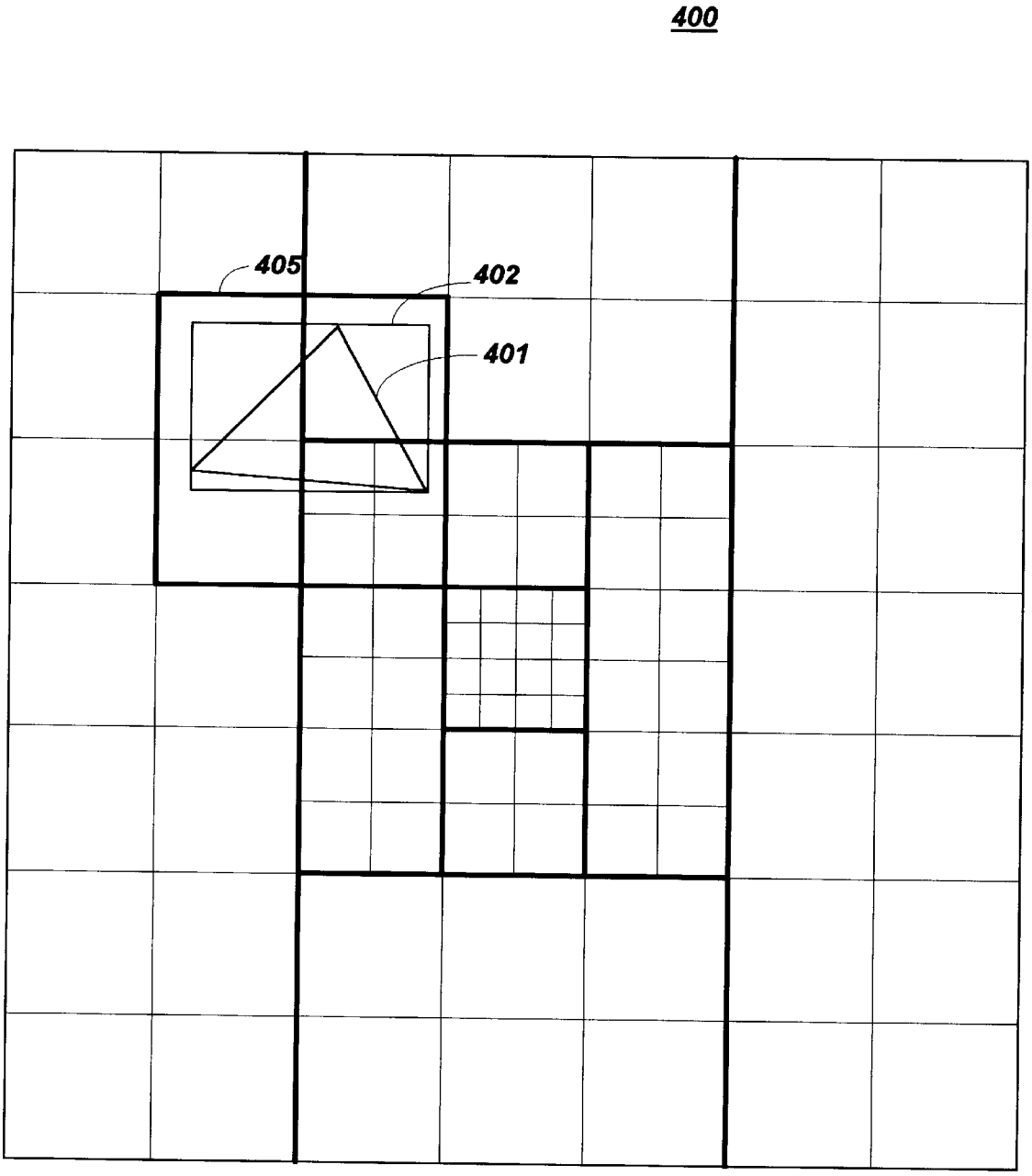
FIG. 4 is a graphical representation of a multi-resolution frame buffer, showing a triangle encapsulated by both a bounding box and a bin-bounding box.
Figure 5:
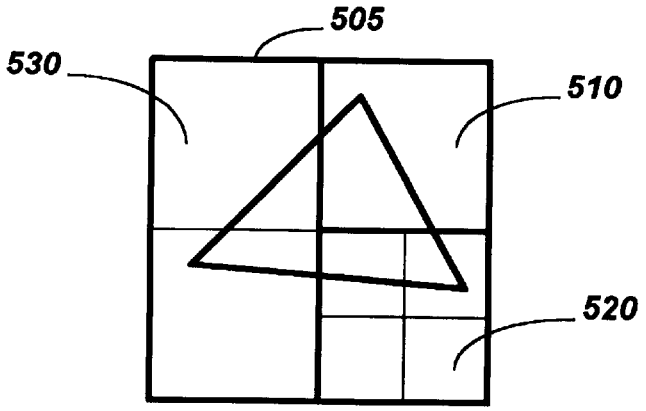
FIG. 5 is a detailed view of a triangle encapsulated by both a bounding box and a bin-bounding box, and partially covering three different sub-regions.
Figure 6:
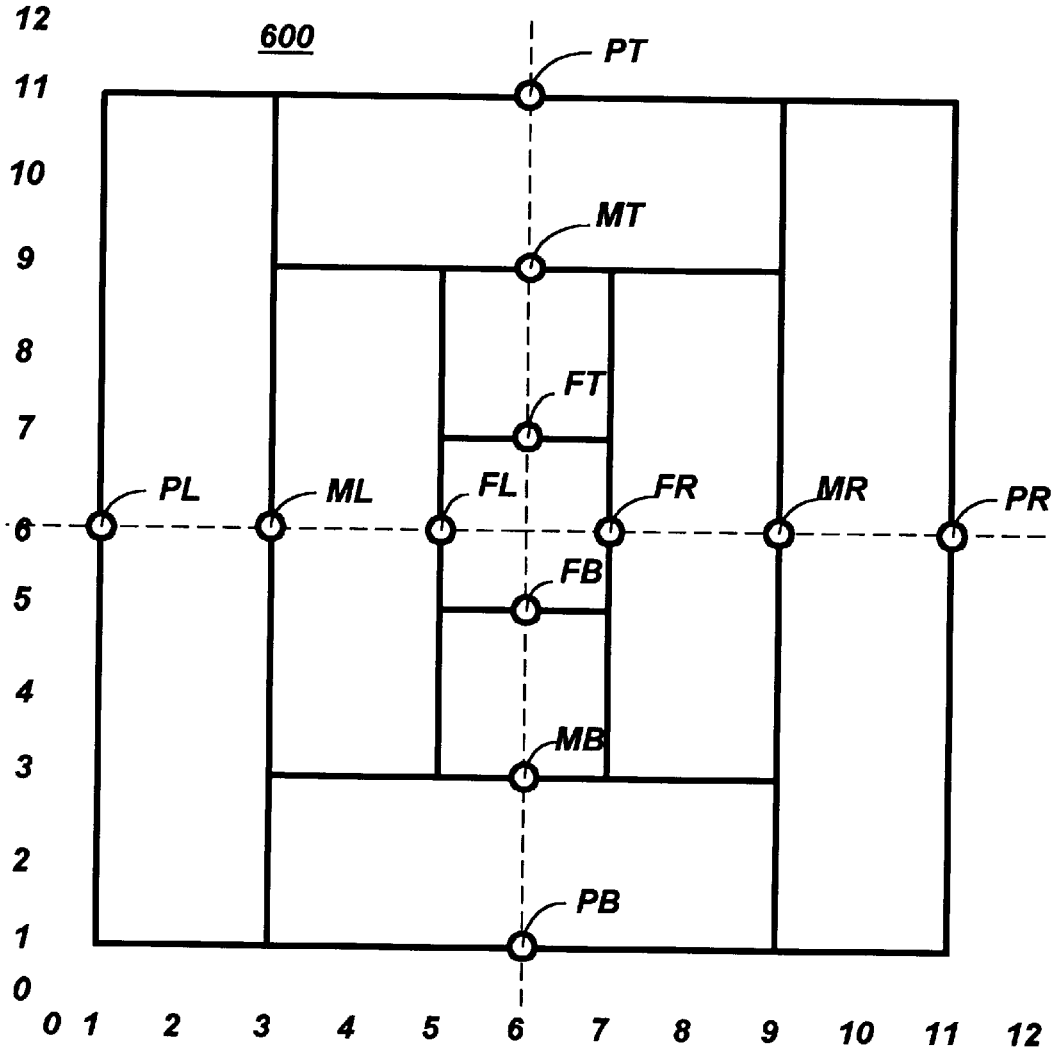
FIG. 6 is a graphical representation of a multi-resolution frame buffer, showing identifying labels for the sub-region boundaries and showing the 169 possible locations for bounding boxes in the form of a 13×13 matrix.

Similarly, the sub-regions may either be horizontal or vertical. In the embodiment of the frame buffer shown in FIG. 2, the horizontal sub-regions are the peripheral bottom sub-region, the medial bottom sub-region, the medial top sub-region and the peripheral top sub-region. The vertical sub-regions are the peripheral left sub-region, the medial left sub-region, the medial right sub-region and the peripheral right sub-region. As the sub-regions may only be vertical or horizontal, only one bit is needed to encode the direction of the coarsest sub-region. An illustrative example is shown at reference numeral 810 in FIG. 8. As the bin bounding box 810 is not cut by any region or sub-region boundary lines, it is necessary to specify the direction of the coarsest sub-region. The coarsest sub-region, in this case, is the medial left sub-region, the bin bounding box 810 being entirely contained therein. The medial left sub-region, as shown in FIG. 8, is vertical. The foveal region may be considered to be vertical in the frame buffer shown in FIG. 8 and horizontal in the frame buffer of FIG. 11. Alternatively, this bit may be considered a "don't care" bit when the bin bounding box is entirely contained within the foveal region.

It is unnecessary, according to the present invention to specify which region or sub-region boundary line cuts through the bin-bounding box, since this information can be derived from the coarsest region.

Figure 10:
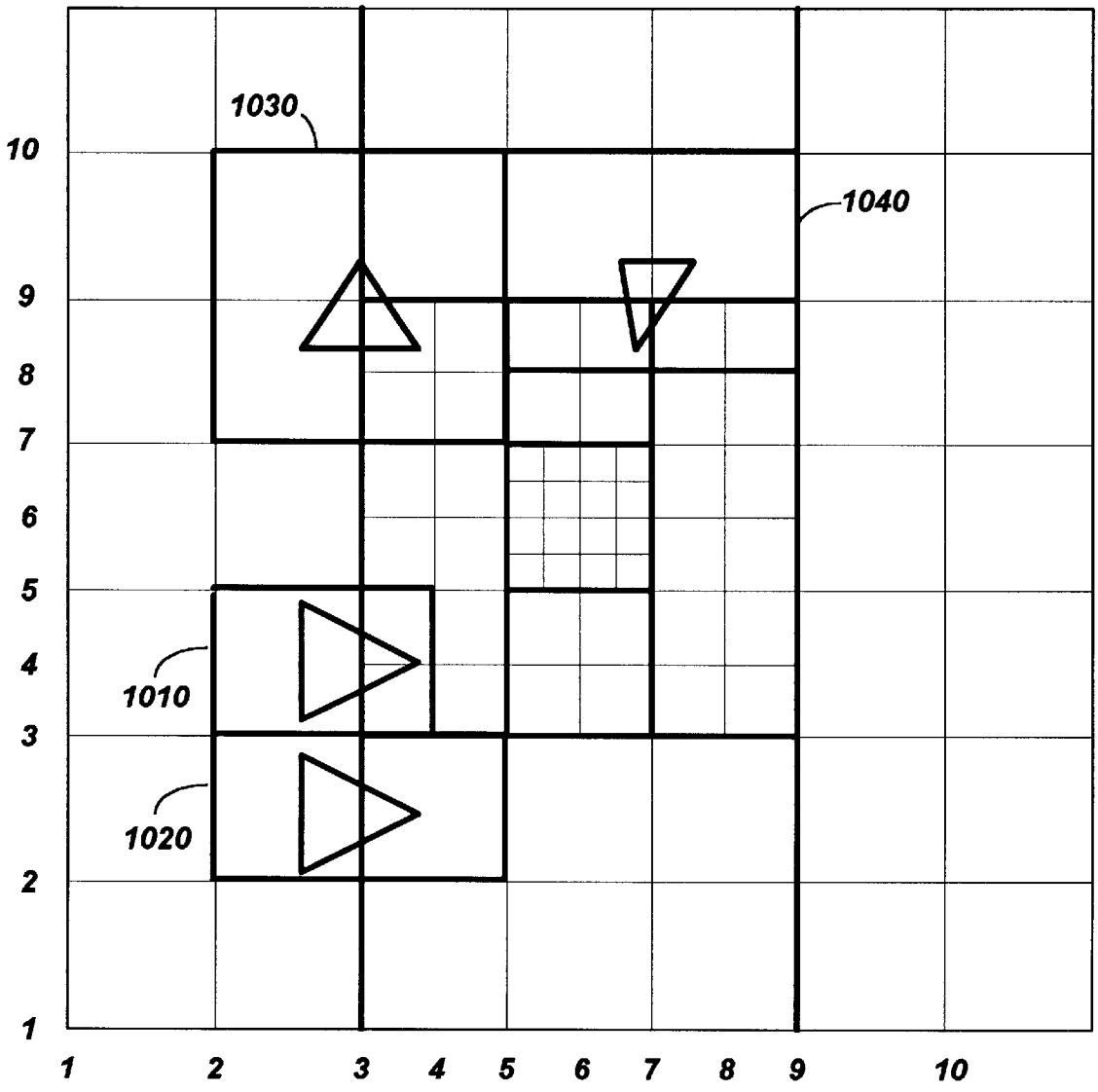
FIG. 10 is a graphical representation of a multi-resolution frame buffer, showing other examples of bin bounding boxes to illustrate the encoding method according to the present invention.

Finally, it is necessary to account for one additional condition: there are cases wherein the encoding of a location of a bin-bounding box could be ambiguous, i.e., wherein two different bin bounding box locations could be encoded in the same way. Such locations would then be indistinguishable. For example, a bin-bounding box might be specified as follows: Coarsest Region: Peripheral; Number of cuts: One, and Direction of 1$^{st}$ Cut: Vertical. Such a bin-bounding box could be cut by the medial left boundary line (ML), partially covering both the peripheral left sub-region and the peripheral bottom sub-region as shown at 1020 in FIG. 10, or partially covering the peripheral left sub-region and the medial left sub-region, as shown at 1020. For that reason, it is necessary to specify whether a portion of the coarsest region appears on both sides of the first cut. As shown in FIG. 10, bin-bounding box 1010 partially covers two regions, whereas bin-bounding box 1020 although partially covering two distinct sub-regions, is nevertheless located only in the peripheral region. Therefore, the bin bounding box 1020 partially covers only one region. Moreover, a portion of the coarsest region appears on both sides of the first cut; namely, the medial left boundary line. The coarsest region (the peripheral region) of bin bounding box 1010, on the other hand, does not appear on both sides of the first cut. Indeed, the medial left boundary line completely separates the bin bounding box 1010 into two different regions; namely the peripheral and medial regions.

To specify this attribute, one additional bit is used. A single bit called, for example, the DifferentNotSame bit is used to denote whether a portion of the coarsest region appears on both sides of the first cut. In the example shown in FIG. 10, the DifferentNotSame bit would be in one state (0 or same) for the bin-bounding box 1020 partially covering the peripheral left and peripheral bottom sub-regions. The DifferentNotSame bit would be in the other state (1 or different) for the bin-bounding box 1010 partially covering peripheral left and medial left sub-regions.

The DifferentNotSame bit is not only necessary when there is one cut, as is the case with bin bounding boxes 1010 and 1020, but is also necessary when there are two cuts. This situation is also illustrated in FIG. 10. Bin bounding box 1040 encapsulates a triangle that is located in the third quadrant 730, whereas bin bounding box 1030 encapsulates a triangle located in the fourth quadrant 740. The locations of these bin bounding boxes, of course, would be encoded in the first quadrant 710, and the RightNotLeft and TopNotBottom bits set appropriately in the manner set forth above. For ease of reference, the numbering is extended beyond the first quadrant in both the horizontal and vertical directions. For bin bounding box 1030, the DifferentNotSame bit would be in one state (0, same) and in another state (1, different) for bin bounding box 1040. For bin bounding box 1030, the DifferentNotSame bit is 0 or same, because a portion of the coarsest region appears on both sides of the first cut. For bin bounding box 1040, the DifferentNotSame bit is 1 or different, for example, because no portion of the coarsest region appears on both sides of the first cut. Indeed, for both bin bounding boxes 1030 and 1040, the peripheral region is the coarsest region. This coarsest region appears on both sides of the first cut (the medial left boundary line) of bin bounding box 1030. However, the peripheral region does not appear on both sides of the first cut (the medial top boundary line) of the bin bounding box 1040. Therefore, the DifferentNotSame bit would be 0 or same for bin bounding box 1030 and 1 or different for bin bounding box 1040. If the bin bounding box is entirely contained within a single sub-region the DifferentNotSame bit is 0 or same.

Therefore, using only 6 bits; namely, 2 bits to specify the coarsest region, 2 bits to specify the number of cuts, 1 bit to specify the direction of the first cut or the direction of the coarsest sub-region and 1 bit to specify whether the coarsest region appears on both sides of the first cut, any location of any bin-bounding box may be completely encoded.

Indeed, the memory programmed according to the encoding method of the present invention could be configured as follows. Each of the locations 1–6 in the horizontal direction y be characterized as rows, and each of the locations in the horizontal direction may be characterized as columns. Therefore, the bin bounding boxes 810 and 820 of FIG. 8, the bin bounding box 910 of FIG. 9 and the bin bounding box 1010 of FIG. 10 would be respectively defined in the stochastic memory programmed according to the encoding method of the present invention as follows:

| Location (Address in memory) | | Content of memory | | | |
|---|---|---|---|---|---|
| | | Coarset Region | # Cuts | Dir. of 1$^{st}$ cut/Dir. of coarset sub-region | Different Not Same |
| Row | Column | (2 bits) | (2 bits) | (1 bit) | (1 bit) |
| 4 | 4 | Medial | None | Vertical | Same |
| 2 | 3 | Peripheral | One | Vertical | Same |
| 3 | 3 | Peripheral | Two | Vertical | Same |
| 4 | 3 | Peripheral | One | Vertical | Different |

Therefore, according to the present invention, for a frame buffer having three regions, a memory may be configured as a 36×6 memory, meaning a memory having 36 discrete locations, each location being 6 bits wide. The present invention reduces the number of bits stored in the memory from a 121×24 memory having 2904 bits to a 36×6 memory having 216 bits, thus reducing the size thereof by a factor of approximately 13.4. Such a reduction in the size of the memory makes for a memory of smaller physical size, and one that takes up less silicon area than its predecessor. A smaller memory is also easier to program, which reduces the probability of introducing errors therein during programming.

According to an alternative embodiment of the present invention, the number of cuts is not encoded. Rather, the number of sub bounding boxes within the bin-bounding box is encoded and stored in a memory. Such a memory, therefore, would include 36 locations, each location storing 2 bits to specify the coarsest region, 2 bits to specify the number of sub bounding boxes (one, two or three), 1 bit to determine the direction of the first cut or the direction of the coarsest sub-region and 1 bit to indicate whether a portion of the coarsest region appears on both sides of the first cut.

The storing of these attributes, according to the present invention, may be carried out by programming a Random Access Memory (RAM), a Read Only memory (ROM), or a Programmable Logic Array (PLA). Alternatively a suitable logic expression could be synthesized.

Figure 11:
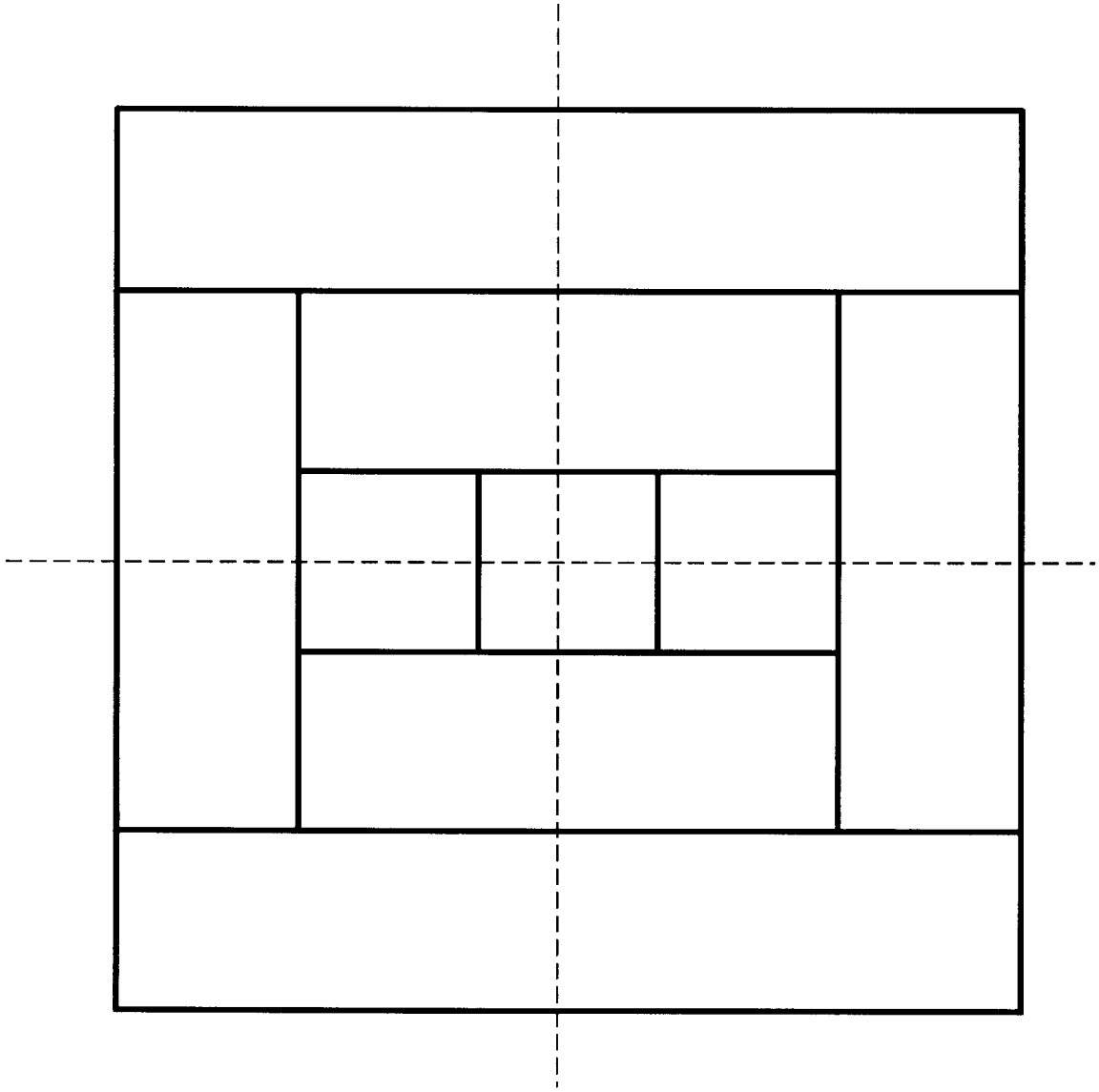
FIG. 11 is a graphical representation of another embodiment of a multi-resolution frame buffer upon which the method according to the present invention may be practiced.

According to a still further embodiment of the present invention, the encoding method according to the present invention may readily be applied to a multi-resolution frame buffer whose region and sub region boundary lines are rotated 90° with respect to the frame buffer shown in FIG. 7. Such a multi-resolution frame buffer is shown in FIG. 11.

The method according to the present invention may also readily be applied to a multi-resolution frame buffer having a number of regions different than three.

While the foregoing detailed description has described preferred embodiments of the present invention, it is to be understood that the above description is illustrative only and not limiting of the disclosed invention. For example, the encoding method of the present invention is also well suited to the situation wherein the multi-resolution frame buffer changes dynamically to always present the region of highest sampling density directly where the user is looking. Also, other attributes could advantageously be encoded, other than those described herein. Instead of the coarsest region, the nearest boundary line could be encoded, either toward regions of higher sampling density, or toward regions of lower sampling density. Other modifications will occur to those of skill in this art, and all such modifications are deemed to fall within the scope of the present invention. Thus, the invention is to be limited only by the claims as set forth below.

What is claimed is:

1. A method of encoding and storing locations of bounding boxes of drawing primitives to be rendered on a multi-resolution display, comprising the steps of:

dividing a viewable area of the multi-resolution display into four quadrants;

encoding only selected attributes of each of a plurality of bounding box locations within only one of the four quadrants of the multi-resolution display, the selected attributes including information regarding regions and sub-regions of different resolutions within the multi-resolution display and boundary lines therebetween; and storing the encoded selected attributes in a memory.

2. The encoding and storing method of claim 1, wherein the dividing step divides the viewable area along two lines of symmetry to create the four quadrants.

3. The encoding and storing method of claim 1, wherein the dividing step divides the viewable area along two perpendicular lines of symmetry, whereby the four quadrants are created within the viewable area of the multi-resolution display.

4. The encoding and storing method of claim 1, wherein at least one of the regions is subdivided into a plurality of sub-regions by boundary lines, and wherein the selected attributes include information relative to a region of lowest resolution partially covered by each of the bounding boxes; one of a number of boundary lines cutting each of the bounding boxes and a number of sub bounding boxes forming each of the bounding boxes; one of a direction of a first boundary line cutting through each of the bounding boxes and a direction of a sub-region of lowest resolution partially covered by each of the bounding boxes; and an indication as to whether a portion of the region of lowest resolution appears on both sides of the first boundary line cutting through each of the bounding boxes.

5. The encoding and storing method of claim 1, wherein the viewable area of the multi-resolution display includes first, second and third nested regions of progressively higher resolution, the first and second regions each being divided into four sub-regions, and wherein the storing step stores the selected attributes in thirty six memory locations, the thirty six locations corresponding to a number of all possible bounding box locations within one of the four quadrants.

6. The encoding and storing method of claim 1, wherein the multi-resolution display includes a peripheral region, a medial region and a foveal region, the foveal region being an innermost region and having a highest resolution, the peripheral and medial regions each being divided into four sub-regions separated by the boundary lines, and wherein the selected attributes include two bits to specify a region of lowest resolution for each of the bounding boxes; two bits to specify one of a number of boundary lines cutting each of the bounding boxes and a number of sub bounding boxes contained within each of the bounding boxes, one bit to specify one of a direction of a first boundary line cutting through each of the bounding boxes and a direction of a sub-region of lowest resolution, and one bit to specify whether a portion of the region of lowest resolution appears on both sides of the first boundary line cutting through each of the bounding boxes.

7. The encoding and storing method of claim 1, wherein the storing step stores the selected attributes in thirty-six discrete memory locations as six bit data words.

8. The encoding and storing method of claim 1, wherein the storing step is carried out by alternatively synthesizing a logic expression and by programming one of a Random Access Memory (RAM), a Read Only memory (ROM), and a Programmable Logic Array (PLA).

9. The encoding and storing method of claim 1, wherein the drawing primitives are triangles.

10. The encoding and storing method of claim 1, wherein the bounding boxes are bin bounding boxes and wherein the encoding step encodes selected attributes of the locations of a plurality of bin bounding boxes.

11. A method of encoding locations of bounding boxes of drawing primitives for a multi-resolution fame buffer, comprising the steps of:

dividing a viewable area of a multi-resolution display into four quadrants along two lines of symmetry;

encoding bounding box locations only within one of the four quadrants;

setting at least one variable from which bounding box locations encoded within the one of the four quadrants of the viewable area may be extrapolated to an entire viewable area of the display.

12. The encoding method of claim 11, wherein the setting step sets a first and a second bit for the encoded bounding box location, the first and second bit indicating whether each encoded bounding box location should be flipped left to right, and bottom to top, respectively, to extrapolate the location of each of the encoded bounding box locations in each of the four quadrants from the encoded bounding box locations in the one quadrant.

13. A method of encoding bounding boxes of primitives to be rendered on a multi-resolution display having a plurality of regions of different resolutions, at least one of the regions comprising a plurality of sub-regions, the regions and sub-regions being delimited by boundary lines, the method comprising:

a first encoding step to encode a region of lowest resolution that is partially covered by each of the bounding boxes;

a second encoding step to encode one of a number of boundary lines cutting each of the bounding boxes and a number of sub bounding boxes contained within the bounding box;

a third encoding step to encode one of a direction of a first cut and a direction of a sub region of lowest resolution that is partially covered by each of the bounding boxes; and a fourth encoding step to encode whether a portion of the region of lowest resolution appears on both sides of the first cut cutting through each of the bounding boxes.

14. The encoding method of claim 13, wherein the multi resolution display comprises three regions, and the first encoding step sets two bits to encode the region of lowest resolution; the second encoding step sets two bits to encode one of the number of boundary lines cutting each of the bounding boxes and the number of sub bounding boxes contained within each of the bounding boxes; the third encoding step sets one bit to encode one of the direction of the first boundary line and the direction of the sub-region of lowest resolution partially covered by each of the bounding boxes; and the fourth encoding step sets one bit to encode whether a portion of the region of lowest resolution appears on both sides of the first cut cutting through each of the bounding boxes.

15. A method of specifying and storing locations of bounding boxes of primitives to be rendered on a display, comprising the steps of:

dividing a viewable area of the display along two perpendicular lines of symmetry to create four quadrants;

encoding locations of bounding boxes of primitives to be rendered in only one of the four quadrants;

setting a first and a second bit for the encoded location of each the bounding boxes, the first and second bits indicating whether each encoded bounding box location should be flipped left to right, and bottom to top, respectively, to derive a location of each of the encoded bounding boxes in each of the four quadrants from the encoded location in the one quadrant; and storing the encoded locations in a memory, whereby, encoding bounding box locations in only one quadrant reduces a size of the memory needed to encode all bounding box locations within the display.

* * * * *